United States Patent
Kuang et al.

(10) Patent No.: US 8,679,339 B2
(45) Date of Patent: Mar. 25, 2014

(54) REFUSE LANDFILL LEACHATE WASTEWATER TREATMENT SYSTEM AND TECHNOLOGY

(76) Inventors: Zhiping Kuang, Shanghai (CN); Bin Lu, Shanghai (CN); Wei Xiong, Shanghai (CN)

( * ) Notice: Subject to any disclaimer, the term of this patent is extended or adjusted under 35 U.S.C. 154(b) by 350 days.

(21) Appl. No.: 13/257,910

(22) PCT Filed: May 20, 2010

(86) PCT No.: PCT/CN2010/073031
§ 371 (c)(1),
(2), (4) Date: Sep. 20, 2011

(87) PCT Pub. No.: WO2010/133177
PCT Pub. Date: Nov. 25, 2010

(65) Prior Publication Data
US 2012/0012525 A1    Jan. 19, 2012

(30) Foreign Application Priority Data
May 22, 2009  (CN) .......................... 2009 1 0051803

(51) Int. Cl.
*C02F 3/30*     (2006.01)

(52) U.S. Cl.
USPC ........... 210/605; 210/615; 210/631; 210/763; 210/198.1; 210/259

(58) Field of Classification Search
USPC .............. 210/605, 615, 630, 631, 763, 198.1, 210/252, 259
See application file for complete search history.

(56) References Cited

U.S. PATENT DOCUMENTS

| | | | | |
|---|---|---|---|---|
| 4,892,658 A * | 1/1990 | Martin et al. | ................. | 210/617 |
| 6,056,876 A * | 5/2000 | Yamasaki et al. | ............. | 210/617 |
| 6,283,676 B1 * | 9/2001 | Hater et al. | .............. | 405/129.57 |
| 8,551,341 B2 * | 10/2013 | Conner et al. | ................. | 210/739 |
| 2003/0159988 A1 * | 8/2003 | Daigger et al. | ............... | 210/605 |
| 2005/0201831 A1 * | 9/2005 | Lee et al. | ................. | 405/129.95 |

FOREIGN PATENT DOCUMENTS

| | | |
|---|---|---|
| CN | 200988816 | 12/2007 |
| CN | 101560039 A | 10/2009 |
| CN | 201406361 | 2/2010 |
| KR | 100381298 | 4/2003 |
| KR | 20060039097 | 5/2006 |

* cited by examiner

*Primary Examiner* — Fred Prince
(74) *Attorney, Agent, or Firm* — Houtteman Law LLC

(57) ABSTRACT

This invention relates to a refuse landfill leachate wastewater treatment system comprising a collection well, an adjustment tank, a filter, a comprehensive treatment system having a multi-stage anoxic/aerobic pool and a membrane biological reactor. The process of treatment is: waste water enters a adjustment tanke in which water quality and quantity are adjusted; subsequently, enters a filter, the water discharged from the filter and enters a comprehensive treatment system having a multi-stage anoxic/aerobic pool and a membrane biological reactor, wherein waster water is bio-chemically treated to remove the organic substances, nitrogen and ammonia, and then the wastewater is discharged into a catalyzed oxidation tower; the organic substance in waste water is oxidized on effect of ozone and under the existing catalyst function and then the biochemical capacity thereof is enhanced; and then the catalyzed and oxidized waste water enters carbon filter pool, the remaining contaminated matter can be further removed by degradation of the anoxic oxidation of the biological membrane on the packing material in pool, then the output water meets the requirement of National Standard or other relevant industrial standards.

10 Claims, 2 Drawing Sheets

REFUSE LANDFILL LEACHATE WASTEWATER TREATMENT SYSTEM AND TECHNOLOGY

BACKGROUND OF THE INVENTION

1. Field of the Invention

The present invention relates to a refuse landfill leachate wastewater treatment system and technology, which can be used for treatment of refuse landfill leachate wastewater and other wastewater with high concentration of ammonia and nitrogen. The present invention is in the field of environment protection and wastewater treatment system and technology.

2. Description of Related Art

Refuse landfills and waste incineration power plant usually produce a huge amount of wastewater, and the wastewater has high concentration of BOD and COD, as well as high concentration of ammonia and nitrogen, which is one of the biggest issues in wastewater treatment industry. One major problem is the degradation of refractory organic compound and high concentration of ammonia and nitrogen in the wastewater. The methods that are commonly used by most countries in the world include physical method, physical-chemical method and bio-chemistry method. However, due to the difficulty of degrading organic substances, the high cost of treatment, low nitrogen removal effect and secondary pollution, these methods are not widely used. Further, with the improvement of people's life quality, the national standard for environment protection has been raised, and the ordinary wastewater treatment technology cannot meet the requirement of the current standard for treated wastewater.

SUMMARY OF THE INVENTION

Example embodiments of the present invention provide a stable and highly efficient refuse landfill leachate wastewater treatment system, which can reduce the pollution that the high concentration of ammonia and nitrogen wastewater may cause to the environment.

In example embodiments of the present invention, a refuse landfill leachate wastewater treatment system comprises a collection well connected to a water inlet of an adjustment tank though a pipe and a lift pump installed in the pipe, a water outlet of the adjustment tank connected to the inlet of a filter through a pipe and a water pump, the water outlet of the filter connected through a pipe to an inlet of a comprehensive treatment system having a multi-stage anoxic/aerobic pool and a membrane biological reactor (hereinafter multi-stage A/O (MBR) Pool), the outlet of the multi-stage A/O (MBR) Pool connected to the water inlet of a catalytic oxidation tower, the outlet of the catalytic oxidation tower connected to a biological carbon filter through a pipe, a discharge pipe connected to the outlet of the biological carbon filter and connected to a sewage disposal system.

The process for treating the refuse landfill leachate wastewater comprises the following steps:

Step 1. Adjusting the wastewater in the adjustment tank for its quality and quantity, and then lifting the adjusted wastewater by the water pump via a filter to thus remove fibers, small particles and suspended substances, the filtering precision of the filter being 0-1000 μm;

Step 2. Supplying the filtered wastewater to the anoxic section of each anoxic/aerobic pool in the multi-stage anoxic/aerobic pool (hereinafter multi-stage A/O Pool), adjusting the PH value in the aerobic section (hereinafter O Section) of each A/O pool in the multi-stage A/O Pool as needed, and adding methanol as carbon source to the O Section of the last A/O Pool of the multi-stage A/O Pool;

Step 3. Supplying the wastewater treated through the biochemical process into the membrane biological reactor (hereinafter MBR), wherein if the MBR is an external membrane biological reactor, the concentrated wastewater returns to the anoxic section (hereinafter A Section) of the first A/O pool of the multi-stage A/O Pool, and if the MBR is an internal membrane biological reactor, the concentrated wastewater returns to the A Section of the first A/O pool of the multi-stage A/O Pool; and then supplying the cleaned wastewater into the catalytic oxidation tower;

Step 4. Degrading organic compounds and improving the bio-degradability of the wastewater in the catalytic oxidation tower through catalysis reaction and oxidation of ozone, and then the supplying the wastewater into biological carbon filter pool;

Step 5. Further degrading the organic substances and nitrogen in the wastewater in the biological carbon filter pool, the suspended substances (hereinafter SS) being blocked by the active carbon due to the attraction function of the active carbon, the output clean water then meeting the national standard for relevant industries.

The present invention adopts an advanced and relatively simple preprocess to remove the large-sized SS first to therefore protect the equipment in the later processing stage from being damaged and decrease the workload for the equipment. The wastewater enters into the multi-stage A/O (MBR) Pool. The organic substances in the wastewater are degraded due to the metabolism of microorganisms and the ammonia and nitrogen in the wastewater are removed due to the function of nitrobacteria and denitrifying bacteria. The A/O pools of the multi-stage A/O Pool are connected in series. The wastewater enters into the A Section of each A/O pool and thus the carbon source in the wastewater can be used most efficiently and the nitration liquid generated in O Section of the A/O pool can enter into the A Section of the next A/O pool in the multi-stage A/O Pool. Thus, the internal cycle process in A/O process is no longer needed. The wastewater out of the multi-stage A/O Pool goes through the MBR. The highly concentrated wastewater returns to the multi-stage A/O Pool to maintain the high biomass, which can reach a concentration of 8-30 g/L. The wastewater out of the MBR enters into the catalytic oxidation tower. Under the strong oxidation function of the ozone enhanced by the catalyst, the organic substances in the wastewater are further degraded.

The present invention has a number of advantages. First, the wastewater enters the A Section of each A/P pool in the multistage A/O Pool. Therefore the volume of the wastewater entered to the Pool can be easily controlled and the operation is simple and flexible. Second, the multi-stage A/O Pool of the present invention adopts an activated sludge process, and the biological carbon filter pool adopts a bio-membrane process. Thus, the two processes supplement each other and thus enhance the removal effect. Third, the process is simple and takes a small space, and thus reduces the cost for infrastructure. Fourth, the operation cost is low. Fifth, the cost for infrastructure is low, and the investment needed for equipment, mainly membrane parts, is low. Sixth, output water has high quality and can meet the requirement of GB8978-1996, with no secondary pollution.

DETAILED DESCRIPTION OF PREFERRED EMBODIMENTS

A preferred example embodiment of the invention is illustrated in the accompanying examples in which:

EXAMPLE

Figure 1:
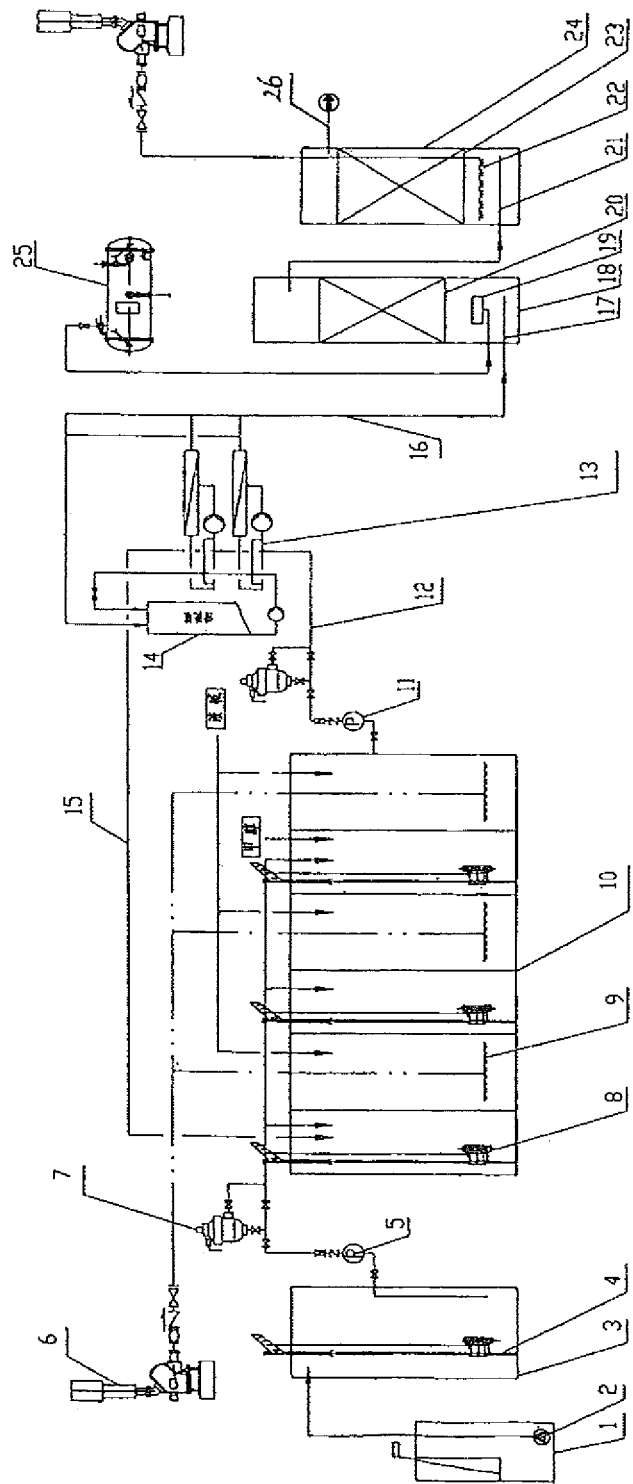
FIG. 1 is a schematic view showing the structure of a refuse landfill leachate wastewater treatment system according to the present invention.

As shown in FIG. 1, a refuse landfill leachate wastewater treatment system according to the present invention includes the collection well 1, which is connected to the water inlet of the adjustment tank 3 through a pipe and the lift pump 2 installed in the pipe. The water outlet of the adjustment tank 3 is connected to the water inlet of the filter 7 through a pipe and the water pump 5. The water outlet of the filter 7 is connected through a pipe to the inlet of the comprehensive treatment system including a multi-stage anoxic/aerobic pool and a membrane biological reactor. The outlet of the comprehensive treatment system including a multi-stage anoxic/aerobic pool (multi-stage A/O Pool) and a membrane biological reactor is connected to a water inlet of the catalytic oxidation tower 18. The outlet of the catalytic oxidation tower 18 is connected to the inlet of the biological carbon filter 24 through a pipe. The outlet of the biological carbon filter 24 is connected to a standard discharge pipe 26, and the standard discharge pipe 26 is connected to a sewage disposal system.

Grids are installed in the collection well 1 to block the large particles, stones, and other floating substances in wastewater. The wastewater enters into the adjustment tank 3 through the lift pump, A first submersible agitator 4 is installed in the adjustment tank 3. The first submersible agitator 4 agitates the wastewater. This agitation not only stirs the wastewater evenly, but also prevents fibers and SS in the wastewater from depositing in the adjustment tank 3. The output wastewater of the adjustment tank 3 is lifted by the lift pump 5 and enters into the filter 7. The filter 7 will remove most of the SS in the wastewater. Thus, the possible damage that SS may cause to the membrane parts may be reduced, and the work load on the multi-stage A/O Pool may be effectively reduced.

The multi-stage A/O (MBR) Pool includes a multi-stage A/O Pool and an MBR. The multi-stage A/O Pool includes two-to-six A/O pools connected in series. In the example embodiment of the present invention, three A/O pools are connected in series. In the A Section of each A/O pool is installed a second submersible agitator 8, which stirs the wastewater and makes the sludge suspended in the wastewater and thus makes the sludge to be in full contact with the high concentration of ammonia-nitrogen in the wastewater. The aeration system 9 is installed in each of the A Section of each A/O pool and is connected to the aerator 6. The aerator may be a micro-pore aerator, a disk jet aerator, an MTS aerator, a Korting Ejector aerator and other types of high-efficiency aerator. The aerator supplies the oxygen needed for degrading organic substance and nitrification reaction, and maintains the concentration of the dissolved oxygen in the wastewater within the range of 2-5 mg/L. Wastewater separately enters the anoxic section of each A/O pool through water inlet pipes, and each inlet pipe is equipped with a flow meter.

The nitrification reaction consumes alkali and denitrification reaction produces alkali. When the alkali produced cannot meet the need for the nitrification reaction, alkali liquid can be added to the O Section in each A/O pool through an alkali liquid supply system equipped in each A/O pool. A carbon supply system is installed on the A Section of the last A/O pool in the multi-stage A/O pool to remove nitrate nitrogen and thus improve the efficiency of total nitrogen removal from the wastewater. The multi-stage A/O pool used as the main body for the biochemistry reaction according to example embodiments of the present invention provides the several advantages. First, it has the advantage of low sludge load for each of the A/O pool, high concentration of sludge, larger biomass, and longer aeration time. Second, it has the advantage of high shock-resistance capability and better output water quality. Third, it can completely remove nitrogen from the wastewater because the wastewater is processed through multi-stage A/O biochemistry reaction and the nitrification reaction alternates with the denitrification reaction. It requires low power for supplying oxygen because the oxygen generated during the denitrification reaction can be used for nitrification reaction. Fourth, stability of the sludge, because the low sludge load and the long stay of the sludge in the aeration tank, the sludge experiences sufficient oxidation and mineralization, and has high stability. Therefore, the sludge can be directly concentrated and a sludge digestion system is thus not needed.

The MBR may be an external spiral wound type membrane, external flat membrane, external tubular membrane or internal hollow fiber membrane. In an example embodiment of the present invention, the MBR includes a liquid intake system 12, a circulation system 13, a cleaning system 14, a return flow system 15 and a clean water outflow system 16. The outlet of the circulation system 13 is connected to the liquid intake system 12. The outlet of the circulation system 13 is connected to the cleaning system 14 and the return flow system 15, respectively. The inlet of the cleaning system 14 is connected to the clean water outflow system 16. The inlet of the liquid intake system 14 is connected to the clean water outflow system 16. The inlet of the liquid intake system 12 is connected to the last A/O pool of the multi-stage A/O pool. The clean water outflow system 16 is connected to the catalytic oxidation tower 18. A water pump 11 is installed on the liquid intake system 12. The MBR removes suspended substances such as colloids more effectively than conventional technologies and ensures that the SDI of the output water is lower than 4. Where the filtering precision is concerned, the MBR can completely remove colloid particles, virus, bacteria, and other pathogenic microorganisms and other big molecular substances in the wastewater. By way of a separated membrane biological reactor system with concentrated wastewater flowing back to the multi-stage A/O pool, the microorganism concentration of the multi-stage A/O pool is controlled within the range of 8-30 mg/L.

The catalytic oxidation tower 18 includes a water intake and distribution system 17, an air intake and distribution system 19 and a catalyst packing layer 20. The water intake and distribution system 17 is connected to the clean water outflow system 16. The air intake and distribution system 19 is connected an external ozone generator 25. The catalyst packing layer 20 is disposed in the middle of the catalytic oxidation tower 18. The core technology of the present invention is two-phase catalytic oxidation. The two phases are: the ozone generated by the ozone generator 25 and the catalyst packing layer 20 disposed on a carrier. The functions of the catalyst are increasing the reaction speed, increasing the efficiency of ozone utilization, decreasing the cost of the process, enhancing the effect of the process, and decreasing the time that the wastewater stays in the tower. After being treated through a biochemical process, the wastewater enters into the catalytic oxidation tower 18, the organic substances in the wastewater are degraded by the catalyst, the refractory organic compound opens rings, big molecules break into small molecules, and the small molecules are further oxidized to $CO_2$ and water. Thus, the COD value of the wastewater is reduced substantially.

The biological carbon filter pool 24 includes water intake and distribution system 21, the air intake and distribution system 22 and the catalyst packing layer 23. The present invention is built on the ideas of contact-and-oxidation method for wastewater treatment and fast-filtering pool for water treatment, which are characterized by aeration, high filtering speed, and blocking suspended substances. The mechanism is as follows. A certain amount of small-diameter grainy filtering media is first added to the biological carbon filter pool 24 to form a packing layer 23. The outside of the grainy filtering media grows a highly active biological membrane. The biological carbon filter pool is aerated. When the wastewater flows through the packing layer 23, due to the oxidation capability of the highly active membrane, the wastewater is purified quickly. This process is called biological oxidation degradation. Meanwhile, because the filtering media is compressed as the wastewater flows through, the small-diameter particles of the grainy filtering media and the biological flocculation of the biological membrane will help block the suspended substances in the wastewater and prevent the biological membrane that come of the filtering media from flowing out with the wastewater. This is called blocking process.

Figure 2:
FIG. 2 is an engineering flow chart showing a refuse landfill leachate wastewater treatment system and process according to the present invention.

Referring to FIG. 1 and FIG. 2, the process for the refuse landfill leachate wastewater treatment is as follows:

Step 1. Original wastewater is adjusted for quality and quantity in the adjustment tank 3 and is then lifted by the water pump 5 to pass through the filter 7 to filter out fibers, small-sized particles and SS, etc. The filtering precision of the filter 7 is within the range of 0-1000 μm;

Step 2. The filtered wastewater enters into the A Section of each A/O pool in the multi-stage A/O pool. The PH value of the O Section of each A/O pool in the multi-stage A/O pool is adjusted as needed, and methanol is added to the O Section of the last A/O pool of the multi-stage A/O pool as carbon source.

Step 3. The biochemically treated wastewater enters into MBR, and the concentrated wastewater out of the MBR flows back to the A Section of the first A/O pool of the multi-stage A/O pool through the return flow system 13. The clean water enters into the catalytic oxidation tower 18 through the clean water outflow system 16.

Step 4. The wastewater in the catalytic oxidation tower 18 reacts with the catalyst packing layer 20 under catalyst reaction and reacts with the ozone generated by the ozone generator 25. Thus, the organic substances in the wastewater are degraded and the biochemical capacity of the wastewater is enhanced. The processed water then enters into the biological carbon filter pool 24.

Step 5. The organic substances and nitrogen in the wastewater in the biological carbon filter pool 24 are further degraded by the biological membrane. The small amount of suspended objects remained in the wastewater is blocked by the active carbon packing layer 23. The output clean water thus produced can then meet the national environment requirement. Two examples showing the use of the present invention:

Example 1

Refuse Landfill Leachate Wastewater Treatment in a Refuse Landfill

The refuse landfill leachate wastewater usually has high concentration of organic substances (CODer can reach 15000 mg/L, BOD5 can reacg 5000 mg.L), ammonia nitrogen (20000 mg/L), and SS (3000 mg/L). By adopting the present invention, the process for the wastewater treatment includes first stage of pre-process, second stage of bio-chemical process, and third stage of deep process. The operation is stable and the cost is low. The output water meets the requirement of national standard (GB16889-2008).

Example Embodiment 2

Wastewater Process for a Leather Plant

The wastewater has high organic containment, high concentration of ammonia and nitrogen, and high concentration of refractory organic compound. The output water processed by the previous technology does not meet the requirement. By adopting the current process and improving the current system, the current process for the wastewater treatment includes first stage of pre-process, second stage of bio-chemical process, and third stage of deep process. The operation is stable and the cost is low. The output water meets the requirement of national standard.

What is claims is:

1. A refuse landfill leachate wastewater treatment system, comprising:
    a collection well (1) connected to a water inlet of an adjustment tank (3) through a pipe and a lift pump (2) installed in the pipe;
    a water outlet of the adjustment tank (3) connected to an water inlet of a filter (7) through a pipe and a water pump (5);
    a water outlet of the filter (7) connected to an inlet of a comprehensive treatment system including a multi-stage anoxic/aerobic pool and a membrane biological reactor through a pipe;
    an outlet of the comprehensive treatment system connected to a water inlet of a catalytic oxidation tower (18);
    an outlet of the catalytic oxidation tower (18) connected to a biological carbon filter pool (24) through a pipe; and
    a discharge pipe (26) connected to an outlet of the biological carbon filter pool (24) and connected to a sewage.

2. The refuse landfill leachate wastewater treatment system according to claim 1, further comprising a first submersible agitator (4) installed in the adjustment tank (3).

3. The refuse landfill leachate wastewater treatment system according to claim 1, wherein the comprehensive treatment system comprises the multi-stage anoxic/aerobic pool consisting of two to six anoxic/aerobic pools connected in series and the membrane biological reactor, and the membrane biological reactor is connected to the last anoxic/aerobic pool of the multi-stage anoxic/aerobic pool.

4. The refuse landfill leachate wastewater treatment system according to claim 3, wherein wastewater is supplied to an anoxic section of each anoxic/aerobic pool and a water meter is placed on a water supply pipe for each anoxic/aerobic pool.

5. The refuse landfill leachate wastewater treatment system according to claim 3, wherein the anoxic section and the aerobic section of each anoxic/aerobic pool are equipped with a second submersible agitator (4) and an aeration system (9), and the second submersible agitator (4) is connected to the aeration system (9).

6. The refuse landfill leachate wastewater treatment system according to claim 4, wherein the aerator (6) is a micro-pore aerator or a jet aerator.

7. The refuse landfill leachate wastewater treatment system according to claim 3, wherein outlets of an alkali solution feeding system are inserted into each of the aerobic sections of the multi-stage anoxic/aerobic pool respectively, and an outlet of a carbon addition system is inserted into the last anoxic section of the multi-stage anoxic/aerobic pool.

8. The refuse landfill leachate wastewater treatment system according to claim 3, wherein the membrane biological reactor is an external spiral wound type membrane, an external flat membrane, an external tubular membrane, or an internal hollow fiber membrane.

9. The refuse landfill leachate wastewater treatment system according to claim 3, wherein the membrane biological reactor comprising a circulation system (13), wherein an inlet of the circulation system is connected to a liquid intake system (12), outlets of the circulation system are connected to a cleaning system (14) and return flow system (15), respectively, an inlet of the cleaning system (14) is connected to an outflow system (16), an inlet of the liquid intake system (12) is connected to the last anoxic/aerobic section of the multi-stage anoxic/aerobic pool, and the outflow system (16) is connected to the catalytic oxidation tower (18).

10. A process for treating refuse landfill leachate wastewater using the refuse landfill leachate wastewater treatment system according to claim 1, comprising the steps of:
  step 1, adjusting wastewater in the adjustment tank (3) for its quality and quantity, and then lifting the adjusted wastewater by the water pump (5) through a filter (7), and thus fibers, small-sized particles and SS can be removed, and the filtering precision of the filter (7) is within the range of 0-1000 μm;
  step 2, supplying the filtered wastewater to each anoxic section of the multi-stage anoxic/aerobic pool, and adjusting PH value in each aerobic section of the multi-stage anoxic/aerobic pool as needed, and adding methanol as carbon source to the last aerobic section of the multi-stage anoxic/aerobic pool;
  step 3, after being treated by biochemical process, wastewater being supplied into the membrane biological reactor, wherein if the membrane biological reactor is an external membrane biological reactor, the concentrated wastewater returns to the first anoxic section of the multi-stage anoxic/aerobic pool, and if the membrane biological reactor is an internal membrane biological reactor, the concentrated wastewater returns to the first anoxic section of the multi-stage anoxic/aerobic pool through the water pump, and then the cleaned wastewater is supplied to the catalytic oxidation tower (18);
  step 4, degrading organic compounds and improving biodegradability of the wastewater in the catalytic oxidation tower (18) by catalyst reaction in the catalytic oxidation tower (18) and by oxidation of the ozone, and the wastewater is then supplied to the biological carbon filter (24); and
  step 5, degrading organic substances and nitrogen in the wastewater by the function of the biological membrane in the biological carbon filter (24), and removing suspended substance by the attraction effect of the active carbon.

* * * * *